Aug. 6, 1940.                    E. J. RAY                    2,210,005
                            EDGE TRIMMING MACHINE
                            Filed June 7, 1939                 2 Sheets-Sheet 2
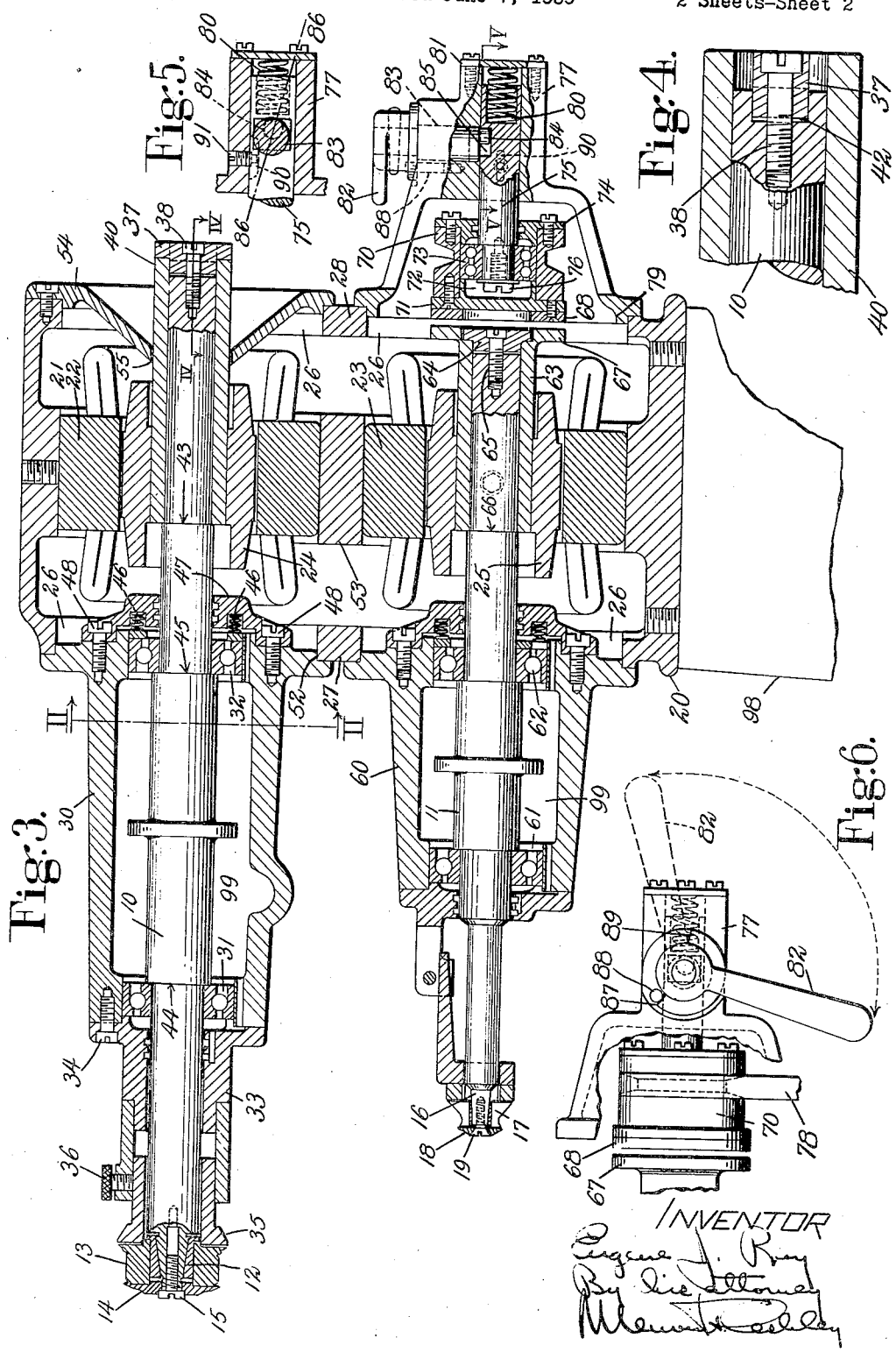
INVENTOR Patented Aug. 6, 1940

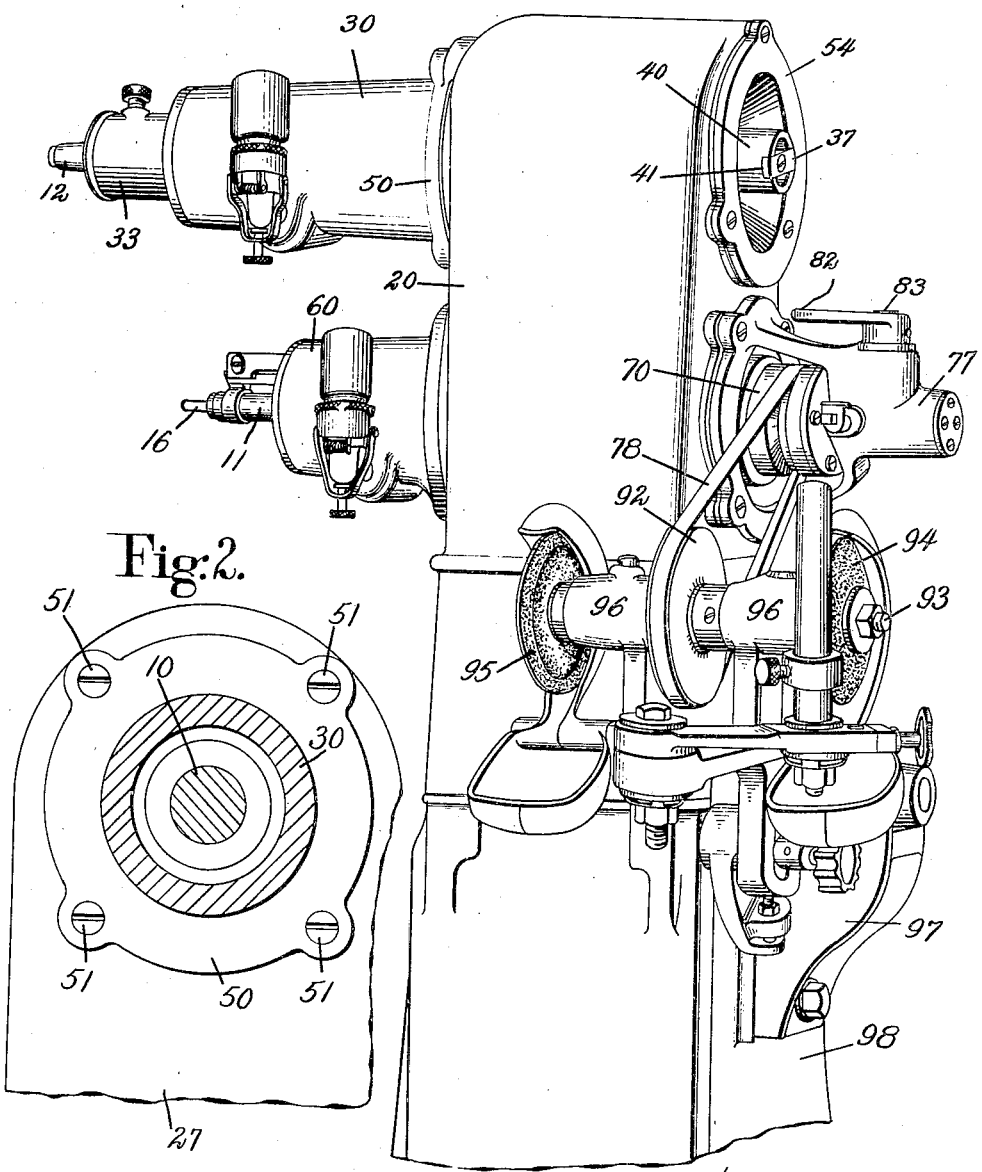

2,210,005

UNITED STATES PATENT OFFICE 2,210,005

EDGE TRIMMING MACHINE

Eugene J. Ray, Beverly, Mass., assignor to United Shoe Machinery Corporation, Borough of Flemington, N. J., a corporation of New Jersey Application June 7, 1939, Serial No. 277,884

2 Claims. (Cl. 12—88)

This invention relates to edge-trimming machines used in shoe-factories to trim the edges of the soles of shoes. The invention is predicated upon that type of machine in which the rotors of induction motors are secured to the cutter shafts to do away with transmission belts and the vibration produced by the whipping action of belts.

The primary object of the invention is to provide an improved machine of the type mentioned in which a rotor-and-bearing assemblage in need of repairing, truing or testing for balance may be quickly replaced with a new or reconditioned assemblage ready for operation without disturbing any adjustment or relationship in either assemblage and without requiring any precision of workmanship to install the assemblage to be used.

The considerations for this object are to provide for doing all the necessary repair work, testing for balance, truing and assembling in the plant where the machine was manufactured and where adequate facilities for insuring precision are available, without moving the entire machine or interrupting its use except to substitute a new or reconditioned unit for the one in need of attention. One reason for these considerations is that shoe-factories have neither the facilities nor the type of skilled workmen required to test, balance or repair assemblages for operation at edge-trimming speeds which, at present, are above 10,000 R. P. M. Another reason is that any procedure that would interrupt the use of the machine for a considerable time or require moving it from its working station would be objectionable from every standpoint.

The illustrated machine, in which are embodied the improvements constituting this invention, is provided with two shaft-and-bearing assemblages, one having, and the other not having, a clutch member for use when a grinding device is to be used to sharpen the cutters. Each shaft-and-bearing assemblage comprises a cutter shaft, ball-bearings in which the shaft is journaled, a bearing sleeve in which the bearings are enclosed, and the rotor of an induction motor. The stator of the motor is enclosed in a dust-excluding chamber in a hollow frame of the machine, and one wall of this chamber has an opening in line with the stator through which the rotor may pass to be inserted into and removed from the stator. Finally, the bearing sleeve has provisions for securing it rigidly against the outer face of this wall to maintain the rotor in cooperative relation to its stator. These elements are so organized that the only procedure necessary to install such an assemblage is to insert the rotor and affix the bearing sleeve to the frame by inserting a few attaching screws.

One shaft-and-bearing assemblage includes the driving member of a clutch. This is so arranged and proportioned as to pass freely through the corresponding wall opening and stator ahead of the rotor, but the driven member of the clutch is independently mounted at a location beyond the stator where it will not in any way obstruct the installing of the rotor, and where it may be shifted to and from engagement with the driving member when this rotor is to be used to drive the grinding device. A manual control is provided to shift the driven member according to whether the power unit is to be used for trimming or for driving the grinding device.

Referring to the drawings,

Fig. 1 is a perspective view of the upper part of an edge-trimming machine in which the present invention is embodied;

Fig. 2 is a sectional view indicated by line II—II in Fig. 3;

Fig. 3 is a vertical section from a point of view nearly the same as that of Fig. 1;

Fig. 4 is a sectional view indicated by line IV—IV in Fig. 3;

Fig. 5 is a sectional view indicated by line V—V in Fig. 3; and

Fig. 6 is a top-plan view of the clutch mechanism otherwise shown at the lower right of Fig. 3.

In accordance with the usual requirements, the machine herein shown is provided with two high-speed cutter-shafts 10 and 11 arranged one above the other, the left-hand end of the upper shaft being formed to provide a conical portion 12 of standard dimensions for carrying a toothed forepart cutter 13 of a well-known type. This cutter is secured to the conical portion 12 in the usual manner by a bushing, a shield 14 and a screw 15. The left-hand end of the lower shaft is also formed to provide a conical portion 16 of standard dimensions for carrying a toothed shank trimming cutter 17 of a well known type. This cutter is secured to the portion 16 in the usual manner by a shield 18 and a screw 19.

The frame 20 is preferably hollow to provide a dust-excluding chamber 21 in which two induction motors are enclosed, one to drive the shaft 10 and the other to drive the shaft 11. Since the present invention is not concerned with the details of construction of the motors, the latter are represented conventionally, the stators thereof being identified by the numerals 22 and 23 and the rotors by the numerals 24 and 25. To provide for inserting the stators into the chamber 21, circular holes 26 are formed in opposite confronting walls 27 and 28 of the frame 20. Since these holes are as large as the outer diameters of the stators, it follows that the rotors may pass freely through them to facilitate mounting and demounting the shaft-and-bearing assemblages.

The forepart shaft-and-bearing assemblage includes the shaft 10, two cooperative ball-bearings 31 and 32 in which the shaft is journaled, a supporting sleeve 30 in which the bearings are enclosed, an extension sleeve 33 secured to the left-hand end of the sleeve 30 by screws 34 to retain the ball-bearing 31 and to exclude dirt therefrom, a cutter-guard 35 adjustably secured in the extension sleeve 33 by a set-screw 36, the rotor 24, and a key 37 at the right-hand end of the shaft to secure the rotor. In the interest of establishing true balance of the rotary assemblage, the key 37 is of symmetrical form and its weight is equally distributed at diametrically opposite points of the axis of the shaft. Moreover, the screw 38 by which the key is secured to the shaft is arranged to lie on that axis.

Since the cutter-shaft is required to rotate at a speed in excess of 10,000 R. P. M. without appreciable variation, exceptional precision with respect to concentricity and balance of the rotary mass is necessary, and for this reason special practices are required to insure true running of the shaft. Accordingly, the rotor 24 is pressed tightly on a sleeve 40 and is thus fixed in permanent relation to the sleeve. The two parts 24 and 40, thus united, are then subjected to the most rigid testing and truing with respect to concentricity and balance which, once obtained, are never disturbed. The right-hand end of the sleeve 40 is provided with diametrically opposite notches 41 to receive the ends of the key 37. One of these notches is clearly shown in Fig. 1 and one end of the key is shown as fitting closely therein. The intermediate portion of the key is closely fitted in a groove 42 formed in the end of the shaft and extending diametrically thereof. The key is thus interlocked with the shaft as well as with the sleeve 40 to provide a positive driving connection. Since these parts and fittings are all symmetrically formed and arranged with respect to the axis of the shaft, they do not militate against the balanced condition of the rotary parts. When the screw 38 is set up tightly it causes the key 37 to press the left-hand end of the sleeve 40 tightly against a shoulder 43 formed on the shaft.

The ball-bearings 31 and 32 not only maintain the shaft 10 in coaxial relation to the sleeve 30 but they also prevent axial displacement of the shaft, and for the latter purpose the shaft is provided with a shoulder 44 that engages the bearing 31 and with a shoulder 45 that engages the bearing 32. To eliminate all end-play of the shaft the outer ball-race of the bearing 32 is biased by light compression springs 46. These are arranged in sockets formed in a collar 47 secured to the sleeve 30 by screws 48.

The shaft-and-bearing assemblage comprising the parts described may be attached to the frame 20 and detached therefrom without disturbing any relationship in such assemblage and without exposing any bearing or bearing surface in the process of doing so. To provide for securing this assemblage to the frame the sleeve 30 is provided with a flat attaching flange 50 which, as shown in Fig. 2, is formed to receive four attaching screws 51. These screws enter the wall 27 of the frame 20 which is bored and tapped for that purpose. The attaching face of the wall 27 is flat to provide a seat for the flange 50 and the latter is formed to provide a concentric shoulder 52 adapted to fit closely in the hole 26 and thereby locate the axis of the shaft in concentric relation to the stator 22.

The body of the stator is seated in a concentric socket formed for its reception in a web 53 of the frame 20. To detach the shaft-and-bearing assemblage intact requires only the removal of the attaching screws 51 whereupon the shaft and the rotor may be withdrawn from the stator 22. The hole 26 in the opposite wall 28 of the frame is provided with a cover-plate 54 to prevent dust from entering the chamber 21. This cover-plate is provided with a concentric opening 55 slightly larger than the sleeve 40, and the sleeve projects therethrough to enable the user to grasp it with one hand while tightening or loosening the screw 15 at the opposite end of the shaft.

The shank-shaft 11 is mounted in a bearing assemblage of the same type as the one hereinbefore described and this assemblage is adapted to be attached and detached intact in the same manner. The bearing sleeve 60, though shorter than the sleeve 30, has similar provisions for securing it rigidly against the outer face of the wall 27 and it is provided with enclosed ball-bearings 61 and 62 in which the shaft is journaled. The rotor 25 and the sleeve 63 are tightly pressed one into the other and are thereafter trued for balance and concentricity as above explained. This rotor assemblage is fastened to the shaft by an interlocking key 64 pressed home by a central screw 65, and the sleeve is thereby secured tightly against a shoulder 66 formed on the shaft. With the exception of the clutch member 67, hereinafter described, this shaft-and-bearing assemblage is, to all intents and purposes, equivalent to the corresponding assemblage first described, but the rotor 25 may be utilized also to drive a grinding device attached to the outside of the frame for the purpose of sharpening the cutters 13 and 17. This shaft-and-bearing assemblage and the clutch are so related that the latter in no way affects the described procedure for attaching and detaching the assemblage, nor does the clutch affect the true running of the shaft 11 or impose any load thereon when disengaged.

The driving member 67 of the clutch is of a size that enables it to pass freely through the stator 23, and as herein shown it is a circular flange formed as an integral part of the sleeve 63 and of the same diameter as the rotor 25. Consequently, when this rotor-and-sleeve couple is trued for balance and concentricity the driving member of the clutch partakes of such treatment, and the inclusion of the element 67 in the rotary mass has no effect on the operating conditions of the cutter 17. The right-hand face of the flange 67 is flat and arranged to be engaged by a driven member comprising a pulley 70, a ring 68 of friction material such as compressed fibre, and an intermediate member 71. The friction ring is fastened by screws to the intermediate member and the latter is fastened by screws to the pulley. The intermediate member closes one end of a concentric chamber 72 formed in the pulley to contain a radial and thrust ball-bearing 73. The opposite end of the chamber is closed by a collar 74 that maintains the bearing 73 against the member 71. The inner ball-race of this bearing is secured tightly to a stem 75 by an attaching screw 76, the stem having a shoulder for this purpose.

To provide for shifting the driven member of the clutch to and from engagement with the driving member 67 the stem 75 is arranged to slide endwise in a bearing member 77. This bearing member has an attaching portion that partially surrounds the pulley but is provided with an opening to permit a transmission belt 78 to run on the pulley as shown in Fig. 1. The attaching portion of the bearing member 77 is fastened against the outer face of the wall 28 of the frame by screws and is provided with a circular shoulder 79 that fits closely in the corresponding opening 26 to maintain the axis of the pulley 70 in alinement with that of the shaft 11.

A compression spring 80 (Figs. 3 and 5) acts against the stem 75 to maintain operating engagement of the driven member with the driving member 67 when the stem is not restrained. The right-hand end of this spring is seated against a disc 81 and the left-hand end bears against the stem 75 in which a socket is formed to receive it. In Figs. 1, 3, 5 and 6 the stem 75 is shown as retracted to disengage the driven member from the driving member 67. To provide for such retraction a handle 82 is affixed to a rock-shaft 83 and the latter is arranged in an individual bearing bored in the member 77. The lower end of the rockshaft 83 is provided with an eccentric portion 84 that projects into a crosswise groove 85 in an upper segment of the stem 75. The eccentric and one wall of the groove are effective to shift the stem endwise to the right when the handle 82 is turned in a clockwise direction to the position represented in solid lines in Fig. 6 where it is arrested by a stop-pin 88. The center of the eccentric portion 84 then stands on the radius represented by broken line 86 in Fig. 5 where it is maintained by the spring 80 against accidental turning in the opposite direction. Stop shoulders 87 and 89 are formed on the hub of the handle 82 to cooperate with the pin 88. The latter is anchored in the bearing member 77. To prevent the stem 75 from turning it is provided with a keyway 90 for a key 91 secured in the bearing member 77. This connection maintains the groove 85 in cooperative relation to the eccentric 84.

The range of angular movement of the handle 82 is represented in Fig. 6 in which the position of the handle represented in broken lines corresponds to the operative position of the driven member of the clutch. The belt 78 transmits rotation from the pulley 70 to a pulley 92 fastened to a shaft 93 on which two grinding wheels 94 and 95 are secured. The shaft is journaled in bearings 96 formed in a member mounted on a bracket 97. This bracket is affixed to a column 98 on which the frame 20 is mounted. Since the present invention is not concerned with the details of this grinding device, but only with the organization of the mechanism by which rotation is supplied to the latter, no further description of the grinding device will be necessary. It will be apparent that so long as the driven member of the clutch is disengaged from the driving member 67, as shown in the drawings, the running conditions of the shaft 11 will not be affected in any respect by the means for transmitting rotation to the grinding device. It will also be apparent that the clutch mechanism is so arranged as not to affect the removal of one shaft-and-bearing assemblage comprising a clutch member 67 nor the installing of another shaft-and-bearing assemblage provided with a similar clutch member. The act of installing one of these shaft-and-bearing assemblages requires no special or additional attention on the part of the person making the installation to locate the driving member of the clutch in cooperative relation to the driven member thereof, since the described formation of the sleeve 60 and the means for fastening it to the frame 20 insure the desired cooperative relation of the clutch members.

When it is necessary to remove the screw 19 at the left-hand end of the shaft 11, the shaft may be stopped after turning off the operating current by shifting the driven member of the clutch into engagement with the driving member 67. The grinding device then has a considerable retarding effect. Once the shaft has stopped turning, it may be restrained by grasping the belt 78, since friction developed between the clutch members by the spring 80 is sufficient for loosening and tightening the screw 19 with a screw-driver.

Although this application is not concerned with the problem of lubricating the ball-bearings 31, 32, 61, and 62, the sleeves 30 and 60 are formed to provide chambers 99 in which small quantities of lubricating are maintained to supply the ball-bearings, and the surplus oil, if any, that flows outwardly through the bearings returns to the chambers 99 through ducts provided for that purpose. The novel features of these provisions for supplying oil to the bearings are the subject-matter of my copending application Serial No. 205,750, filed May 3, 1938.

Having described my invention, what I claim as new and desire to secure by Letters Patent of the United States is:

1. An edge-trimming machine comprising a hollow frame forming a dust-excluding chamber, an induction motor the stator of which is affixed to the frame inside the chamber, a detachable assemblage including a shaft having means at one end for carrying a trimming cutter, a rotor near the other end, spaced ball-bearings located between the cutter and the rotor in which the shaft is journaled and a sleeve in which the ball-bearings are enclosed, a wall of said chamber having an opening through which the rotor may pass to enter said stator, and means for rigidly and detachably fastening a portion of said sleeve against the outer face of said wall to maintain said rotor in cooperative relation to the stator and to provide for attaching said assemblage intact.

2. An edge-trimming machine as specified in claim 1 but also comprising a grinding device, a clutch arranged beyond the end of said stator remote from said wall, the driving member of said clutch being carried by said rotor and of a diameter that enables it to pass freely through said stator, means for shifting the driven member of said clutch to and from engagement with said driving member, and means for transmitting rotation from said driven member to said grinding device.

EUGENE J. RAY.